United States Patent [19]
Goto et al.

[11] Patent Number: 5,835,800
[45] Date of Patent: Nov. 10, 1998

[54] CAMERA AND RECORDING MEDIUM FORWARDING DEVICE SUITABLE FOR USE IN A CAMERA

[75] Inventors: Tetsuro Goto, Funabashi; Akira Katayama, Koganei, both of Japan

[73] Assignee: Nikon Corporation, Tokyo, Japan

[21] Appl. No.: 899,146

[22] Filed: Jul. 23, 1997

Related U.S. Application Data

[63] Continuation of Ser. No. 355,003, Dec. 13, 1994, abandoned.

[30] Foreign Application Priority Data

Dec. 13, 1993 [JP] Japan .................................. 5-341991
Dec. 27, 1993 [JP] Japan .................................. 5-348524

[51] Int. Cl.[6] .......................... G03B 7/00; G03B 7/083; G03B 7/093
[52] U.S. Cl. .......................... 396/235; 396/236; 396/247
[58] Field of Search .................................. 354/234.1, 435, 354/431; 396/220, 235, 236, 247, 244, 242

[56] References Cited

U.S. PATENT DOCUMENTS

| | | | |
|---|---|---|---|
| Re. 34,140 | 12/1992 | Nakajima | 354/412 |
| 3,825,730 | 7/1974 | Worthington, Jr. et al. | 235/92 |
| 4,095,739 | 6/1978 | Fox et al. | 235/382 |
| 4,174,891 | 11/1979 | Flint et al. | 353/26 |
| 4,325,614 | 4/1982 | Grimes | 354/23 D |
| 4,448,506 | 5/1984 | Saegusa et al. | 354/431 |
| 4,453,811 | 6/1984 | Yamasaki | 354/412 |
| 4,716,432 | 12/1987 | Stephany | 354/435 |
| 4,757,334 | 7/1988 | Volent | 354/76 |
| 4,972,099 | 11/1990 | Amano et al. | 307/303 |
| 5,220,376 | 6/1993 | Tagami et al. | 354/435 |
| 5,245,380 | 9/1993 | Yang | 354/435 |
| 5,257,056 | 10/1993 | Kazumi | 354/234.1 |

*Primary Examiner*—Safet Metjahic
*Assistant Examiner*—Christopher E. Mahoney

[57] ABSTRACT

A camera has a calculator which calculates a photographing condition suitable for a selected exposure mode. A driving device of the camera performs a photographing operation in accordance with a nominal value of an exposure parameter calculated by the calculator. The camera is provided with a measurement device which measures a real value of the exposure parameter in the photographing operation. The calculator is controlled to perform an exposure calculation on the basis of the real value of the exposure parameter obtained by the measurement device.

11 Claims, 14 Drawing Sheets

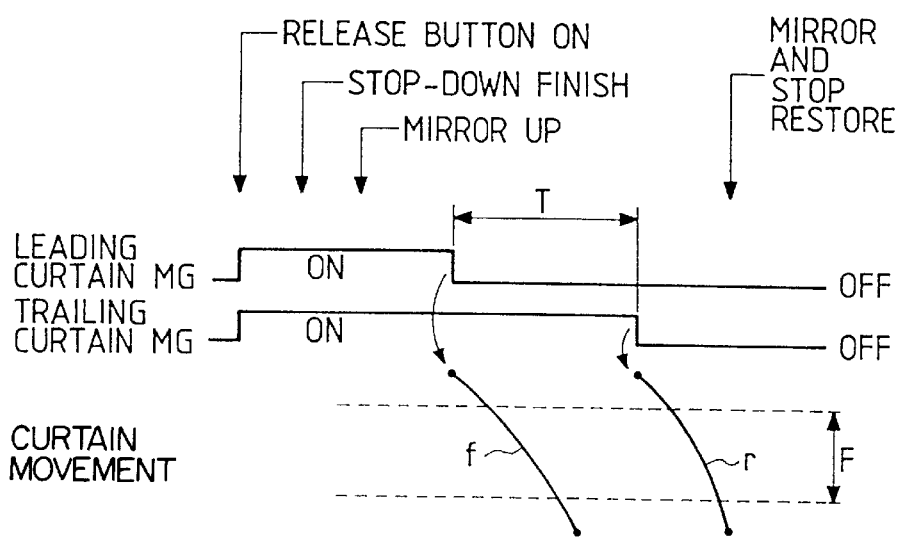
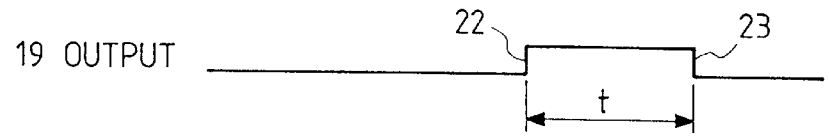

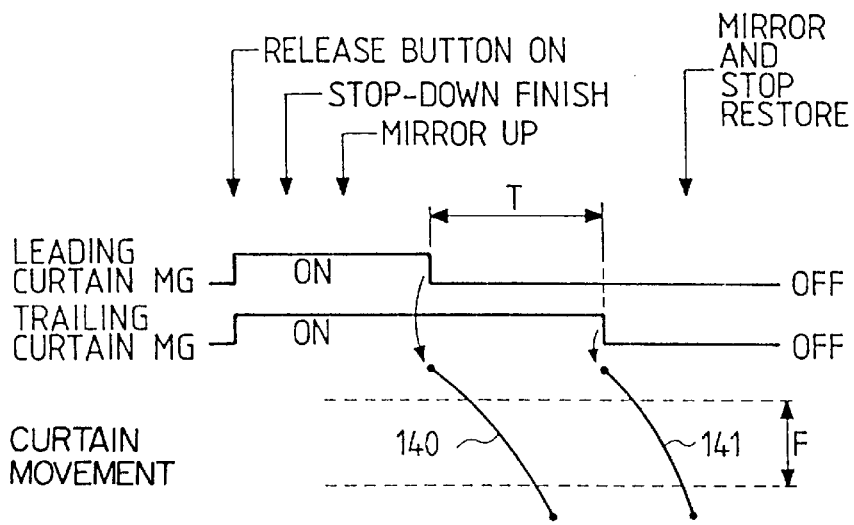
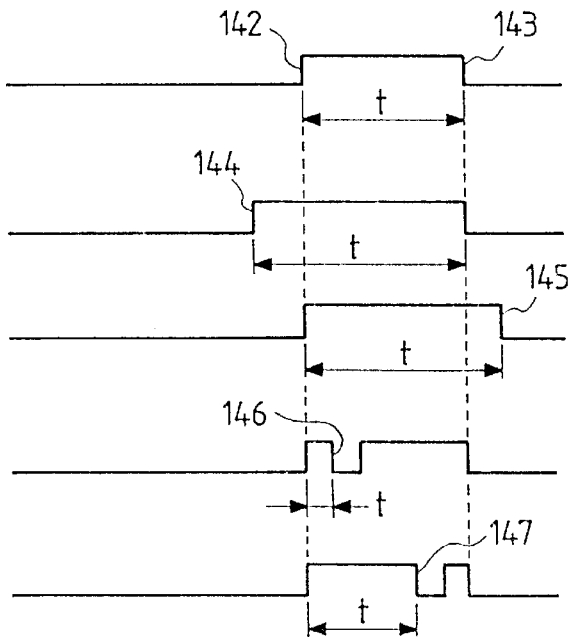

CAMERA AND RECORDING MEDIUM FORWARDING DEVICE SUITABLE FOR USE IN A CAMERA

This application is a continuation of application Ser. No. 08/355,003, filed Dec. 13, 1994, now abandoned.

BACKGROUND OF THE INVENTION

1. Field of the Invention

The present invention relates to a camera having a shutter measuring device for detecting the operating state of a shutter used in a camera.

The present invention also relates to a recording medium forwarding device suitable for use in a camera having a detection device for detecting the operating state of a shutter.

2. Related Background Art

In conventional cameras, a light beam from an object is limited by a stop of a lens, and the exposure time on a film is limited by a mechanical shutter. A shutter used in a single-lens reflex camera basically consists of two curtains, i.e., leading and trailing curtains, and a so-called leading curtain covers the film frame before exposure. Upon depression of a shutter button, the leading curtain is retracted from the film frame first, and the exposure process on the film frame is started. The curtains are moved by mechanically biased spring forces, and begin to move by releasing their locked states.

In past cameras, these operations are controlled purely mechanically. However, in recent years, these operations are normally achieved by electrical control. Although the moving operation itself of the leading and trailing curtains is achieved by the spring forces as in the past cameras, the start of the moving operation is controlled by energizing electromagnets which lock the curtains.

High shutter speeds, such as 1/8000 sec, are tending to become important specifications of cameras, and a high electronic flash synchronization speed must be attained to allow a photographing operation in a bright environment. In order to achieve these objects, the moving speeds of the curtains must be greatly increased by increasing the above-mentioned spring forces, and control must be made to realize a small slit width formed by the leading and trailing curtains.

However, even when the energization control timings of the electromagnets are accurately controlled, the actual exposure time obtained on the film surface depends on the mechanical moving states of the curtains as in the conventional cameras. Variation factors include a variation in release speed of lock mechanisms with respect to the electromagnets, a variation in friction of a mechanical moving system including the springs, and the like. Furthermore, since such a mechanical system has variation characteristics due to temperature characteristics, aging, and the like, various variations are presented as a whole.

For example, in a shutter priority mode, an aperture value is calculated on the basis of a manually selected shutter time, and the shutter and the stop are operated to obtain a proper exposure amount. However, the selected shutter time (nominal value) is often different from a true shutter time (control value) controlled based on the nominal value for the above-mentioned reasons.

In the conventional cameras, since calculations and control are controlled based on the nominal value, a correct exposure result cannot be obtained. More specifically, in the above-mentioned example, since the aperture value is calculated and controlled on the basis of the nominal value of the shutter time, an overexposure or underexposure amount is undesirably produced in correspondence with the difference between the nominal and the control values.

Conventionally, since each of the shutter curtains are constituted by a plurality of blades, it is reported not only for high-speed shutters but also for conventional shutters that the blades of a curtain may contact those of a neighboring curtain upon movement due to their delicate motion explained by the hydromechanics, and they may break. In order to realize a stable high-speed shutter, a decrease in mass of each curtain is demanded more strongly than in conventional ones. In order to decrease the mass of a curtain material, the material is changed from a metal to a resin, as a matter of course, and its thickness must be carefully selected.

When each shutter curtain is formed using a thin resin film, the curtain is more easily influenced by the above-mentioned hydromechanics, and the relative mechanical strength is lowered, thus increasing the possibility of the above-mentioned blade break phenomenon. When a blade breaks, a portion torn off from the blade may often project toward the film side. When a user feeds a film at high speed without noticing it, the projecting blade portion may damage the film.

In the conventional cameras, since the blade projecting phenomenon cannot be detected during a photographing operation, a user can notice such a trouble only after he or she opens the rear over or after the film is developed. Of course, the film is damaged and unrecoverable at that time.

Since projecting of the blade means absence of a light-shielding member, light from a lens undesirably exposes a film portion facing the aperture via the broken portion of the blade. If the film is rewound in this state, even an already exposed film portion wound around a spool may be spoiled.

SUMMARY OF THE INVENTION

It is an object of the present invention to provide a camera which can prevent an exposure error caused by a difference between a nominal value and a real value of an exposure parameter such as a shutter time, an aperture value, or the like of the camera.

A camera according to the present invention comprises:
calculation means for calculating a photographing condition suitable for a selected exposure mode;
driving means for performing a photographing operation in accordance with a nominal value of an exposure parameter calculated by the calculation means;
measurement means for measuring a real value of the exposure parameter in the photographing operation; and
control means for controlling the calculation means to perform an exposure calculation on the basis of the real value of the exposure parameter obtained by the measurement means.

It is another object of the present invention to provide a camera with a shutter measuring device, which camera can calculate or display an accurate exposure amount by executing control or display associated with a shutter time on the basis of a real shutter time measured by measuring means.

In order to achieve the above object, according to the present invention, there is provided a camera comprising: calculation means for calculating a photographing condition suitable for a selected exposure mode; shutter driving means for driving a shutter in accordance with a shutter time value calculated by the calculation means; measurement means for measuring a shutter time obtained upon driving by the shutter driving means; and control means for controlling the calculation means to perform an exposure calculation on the basis of a real shutter time obtained by the measurement means. In the camera having the shutter measuring device with the above-mentioned arrangement, the control means is arranged to control the calculation means so as to perform an exposure calculation on the basis of a real shutter time obtained by the measuring means. Therefore, control or display associated with a shutter time can be realized on the basis of the real shutter time measured by the measuring means, and an accurate exposure amount can be calculated or displayed.

It is still another object of the present invention to generate a warning indicating a trouble of a shutter upon photographing, and to protect important photographed results by switching a film feed mode to a mode in which a film is not easily damaged.

In order to achieve the above object, according to the present invention, there is provided a recording medium forwarding device comprising: shutter means for limiting a recording time on a recording medium; operation control means for controlling an operation of the shutter means; operating state detection means for detecting if the operation of the shutter means is normal; and forwarding control means for controlling a forwarding mode of a recording medium in accordance with a detection output from the operating state detection means. In the recording medium forwarding device with the above arrangement, the operating state detection means for detecting if the operation of the shutter means is normal is arranged, and the forwarding mode of the recording medium is controlled in accordance with the detection output from the operating state detection means. Therefore, a warning indicating a trouble of a shutter can be generated upon photographing, and thereafter, a film feed mode is switched to a mode in which a film is not easily damaged, thus preventing important photographed results from being spoiled.

BRIEF DESCRIPTION OF THE DRAWINGS

FIGS. 3A to 3D are timing charts showing the operations of the camera according to the first embodiment;

Figs. 11A to 11H are timing charts showing the operations of the camera according to the second embodiment;

DETAILED DESCRIPTION OF THE PREFERRED EMBODIMENTS

The preferred embodiments of the present invention will be described hereinafter with reference to the accompanying drawings.

Figure 1:
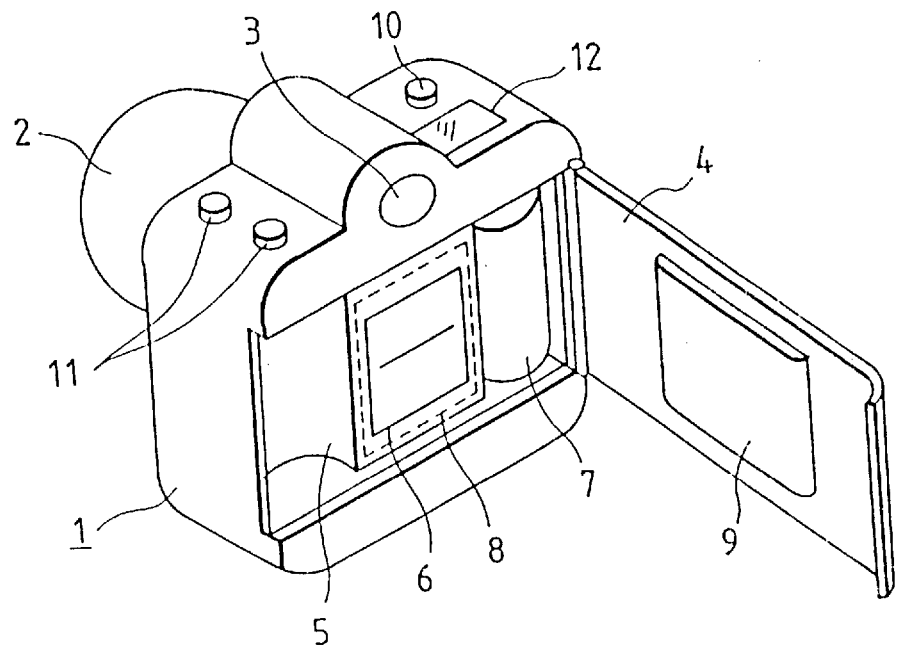
FIG. 1 is a perspective view showing the first embodiment of a camera with a shutter measuring device according to the present invention.

FIG. 1 is a perspective view showing the first embodiment of a camera with a shutter measuring device according to the present invention.

FIG. 1 illustrates a state wherein a rear cover 4 is open. A film patrone (not shown) is loaded on a patrone chamber 5, and a film pulled out from the patrone is wound around a spool 7 via a portion in front of an aperture 6. A pressure plate 9 arranged on the inner surface of the rear cover 4 presses a film (not shown) against the aperture 6 to keep it flat. A shutter 8 (to be described later) is arranged inside the aperture 6. The shutter 8 covers a range slightly wider than the aperture 6, as indicated by a broken line in FIG. 1, and guides object light via a lens 2 onto a film frame for a predetermined period of time. A photographer visually confirms, via a finder 3, the state of an object via the lens 2, and instructs to start an exposure by depressing a release button 10.

Exposure modes and various conditions can be confirmed on an LCD (liquid crystal display) 12. A plurality of setting buttons 11 are operation buttons for arbitrarily setting exposure modes, photographing conditions, and the like of a camera 1. A photographer operates these buttons while confirming characters and the like on the LCD 12.

Figure 2:
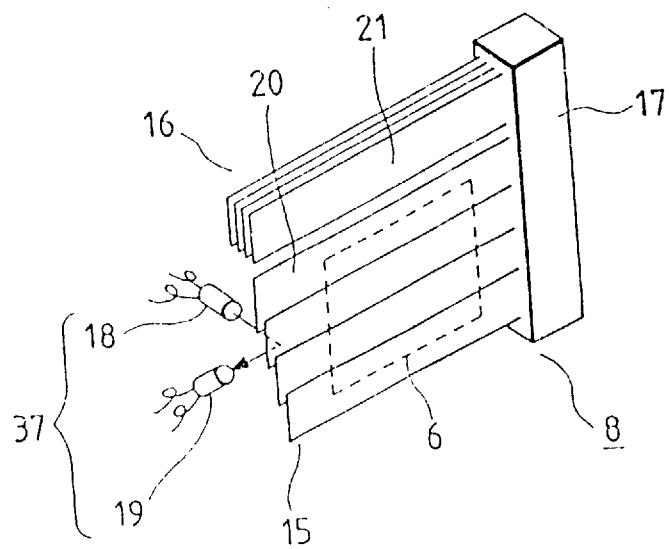
FIG. 2 is a perspective view of shutter curtains of the camera according to the first embodiment.

FIG. 2 shows an embodiment of the shutter 8 used in the present invention. Only the positional relationship between the shutter 8 and the aperture 6 in the camera 1 in FIG. 1 will be explained below with reference to FIG. 2.

FIG. 2 illustrates a state before the release button 10 is depressed, i.e., a state before the start of an exposure. In this state, the aperture 6 indicated by the broken line in FIG. 2 is covered by a leading curtain 15. The leading curtain 15 is normally constituted by a plurality of blades. As shown in FIG. 2, the leading curtain 15 is constituted by, e.g., four blades, and is spread with small overlapping portions, as shown in FIG. 2, when it covers the aperture 6. An uppermost blade 20 in FIG. 2 in the leading curtain 15 is a blade for forming a slit.

Similarly, a trailing curtain 16 is constituted by a plurality of blades, and stands by in a stacked state at a position above the aperture 6 in the state shown in FIG. 2. A frontmost blade 21 in the trailing curtain 16 is a blade for forming the slit. That is, the blade 21 forms the slit together with the slit formation blade 20 in the leading curtain so as to provide an exposure for a desired shutter time to the film. A block 17 is a driving unit which accommodates leading and trailing curtain magnets, which will be described later in an electrical circuit shown in FIG. 4, moving springs, and the like, and basically has a known mechanism such as the above-mentioned two electromagnets for independently locking the curtains, two spring systems for respectively moving the curtains, a link mechanism for vertically translating the blades, and the like.

An exposure operation from the state shown in FIG. 2 is performed as follows.

First, the leading curtain magnet (not shown) releases the leading curtain 15. Then, the leading curtain 15 is folded and retracted to a position below the aperture 6 (to a lower portion in FIG. 2). At this time, the leading curtain 15 is retracted in such a manner that the slit formation blade 20 is folded last. Thus, a member for shielding object light is removed from the aperture 6 portion, and an exposure onto the film is started. After an elapse of a predetermined period of time, the trailing curtain magnet (not shown) releases the trailing curtain 16. Then, the trailing curtain 16 moves downward from the illustrated position to spread over the aperture 6. At this time, the trailing curtain 16 moves in such a manner that the slit formation blade 21 is spread into the trailing curtain blades. With this operation, the aperture 6 is covered by the trailing curtain 16 in turn, and the exposure for the predetermined time is completed.

After the above-mentioned exposure operation, the film is fed by one frame by a wind-up mechanism (not shown), a new, non-exposed portion of the film faces the aperture 6, and the curtains 15 and 16 move upward to be restored to a state before the exposure.

On the other hand, in the shutter 8, a detection means 37 constituted by an LED (light-emitting diode) 18 and a PTR (phototransistor) 19 is arranged to face the vicinity of the leading edges of the blades of the leading and trailing curtains 15 and 16. When the leading or trailing curtain 15 or 16 is present at the position facing the detection means 37, light emitted from the LED 18 is reflected by the blade of the curtain, and is incident on the PTR 19. On the other hand, when no blades are present, i.e., during an exposure, no light is incident on the PTR 19. Therefore, by discriminating the output from the PTR 19, the presence/absence of incident light on the PTR 19, i.e., a real exposure time, can be detected.

FIGS. 3A to 3D are timing charts showing the relationship between the operation sequence of the camera 1 and the operation of the shutter 8. FIGS. 3A to 3D show the moving states of the curtains, which change depending on the ON/OFF timings of the magnets (MGs) for controlling the curtains, and a change in output signal from the PTR 19.

When the release button 10 is depressed, the leading and trailing curtain magnets are energized and turned on to start to electrically lock the corresponding curtains. That is, the mechanical locking operation executed before depression of the release button 10 is switched to electrical control at that timing. Thereafter, stop control of the lens 2 is executed by a mechanism operation (not shown), and a reflection mirror in the photographing optical path is moved upward. Then, the leading curtain magnet is turned off. With this operation, the leading curtain 15 is moved, as indicated by a moving curve f. The moving curve f represents a state wherein the curtain is moved in an opening F along a path shown in FIG. 3C. At this time, since the slit formation blade 20 in the leading curtain 15 passes a position in front of the above-mentioned detection means 37 during the moving operation, the output from the PTR 19 is inverted at a timing 22 in FIG. 3D in the middle of the moving curve f.

Thereafter, the trailing curtain magnet is turned off after an elapse of a time T as a predetermined exposure time. Then, the trailing curtain 16 moves across the opening F, as indicated by a moving curve r. At this time as well, since the trailing curtain 16 passes the position in front of the detection means 37, the output from the PTR 19 is inverted at a timing 23 in the middle of the moving curve r, and is restored to an original state.

As described above, when the inversion time of the PTR 19 is measured in synchronism with the operation timings of the magnets, it can be detected that the true exposure time is t.

Figure 4:
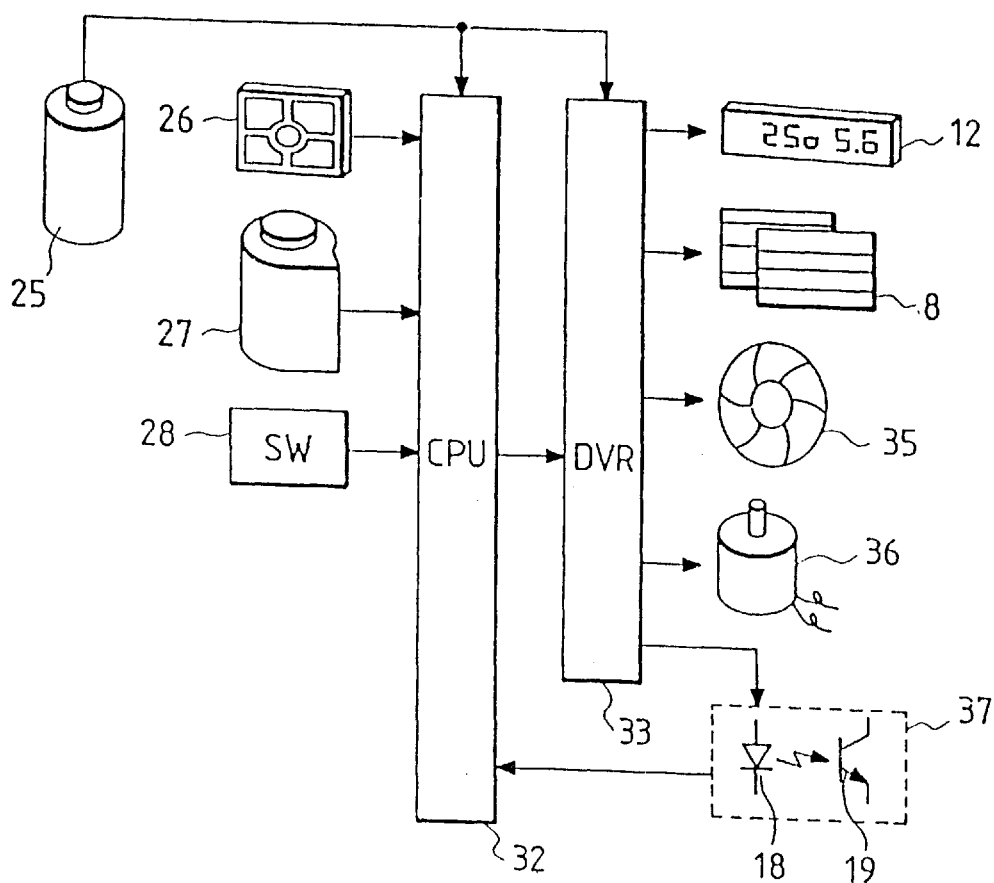
FIG. 4 is a block diagram of the camera according to the first embodiment.

FIG. 4 is a block diagram showing the electrical circuit of the camera 1 which controls the above-mentioned operations. This circuit uses a battery 25 as a power supply, and central control is executed by a CPU 32. Input signals to the CPU 32 are as follows.

A photometry means 26 is a known sensor means comprising a photodiode for measuring brightness values on a plurality of split portions of an object, and a plurality of photometry values are input to the CPU 32. A film sensitivity detection means 27 reads a code signal printed on, e.g., the side surface of a loaded film patrone, and film sensitivity information is input to the CPU 32. A switch detection means 28 includes timing switches for detecting the sequence states of the camera in addition to manual operation switches such as switches interlocked with the above-mentioned release button 10 and the setting buttons 11, and various kinds of status information of the camera are input to the CPU 32.

The output from the CPU 32 executes the following driving operations via a driver means 33. The output from the CPU 32 drives the LCD 12 to display information associated with the selected exposure and operation modes, warning information, and the like. The output from the CPU 32 controls the shutter 8, more specifically, the interval between the operation timings of the leading and trailing curtain magnets, i.e., the exposure time T. The output from the CPU 32 drives a stop 35 in the lens 2 to control the passing light amount. The output from the CPU 32 drives a motor 36 to control the wind-up and rewind feed operations of the film, the biasing operation of the above-mentioned shutter driving springs, and the like. The output from the CPU 32 controls the detection means 37 to turn on the LED 18 for a required period of time, and the CPU 32 receives a signal generated by the PTR 19.

Figure 5:
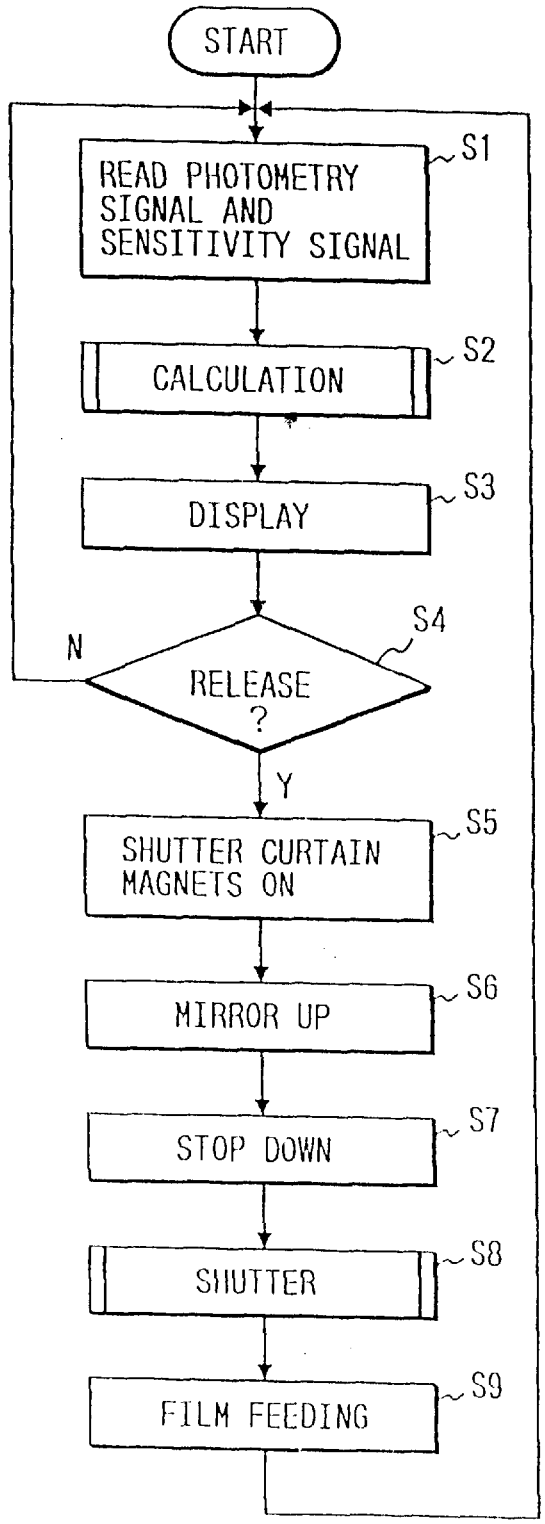
FIG. 5 is a flow chart showing the operation of the camera according to the first embodiment.

FIG. 5 is a flow chart showing the processing routine by the CPU 32 in FIG. 4. This routine is repetitively executed while the power supply is ON.

In step S1, a photometry signal and a sensitivity signal are respectively read from the photometry means 26 and the sensitivity detection means 27. In step S2, the read signals are calculated based on the selected exposure mode to obtain a shutter time and an aperture value as a proper exposure condition. At the same time, a display matching the selected mode is made. The calculation processing will be described in detail later with reference to FIG. 7. In step S3, information other than the contents displayed in step S2 is displayed on the LCD 12. In step S4, it is checked via the switch detection means 28 if the release button 10 is depressed. If N (NO) in step S4, the flow returns to step S1 to repeat the above-mentioned processing.

In step S5, since the release button 10 is depressed, the leading and trailing curtain magnets are turned on, as has been described above with reference to FIG. 5. In step S6, a reflection mirror (not shown) is moved upward and is retracted from the photographing optical path. In step S7, the stop 35 is controlled to have a predetermined stop aperture. In step S8, a shutter routine for controlling the exposure amount onto the film by opening/closing the shutter 8, and a shutter curtain moving state detection routine using the detection means 37 are executed. As the exposure time control value in the shutter routine, the value calculated in step S2 is used. The detection routine will be described in detail later with reference to FIG. 6. In step S9, since the exposure operation has been finished, the motor 36 is rotated in the forward direction to feed the film and to perform the biasing operation of the mechanism. Since a series of exposure operations have been finished, the flow returns to step S1, and the above-mentioned processing is repeated.

Figure 6:
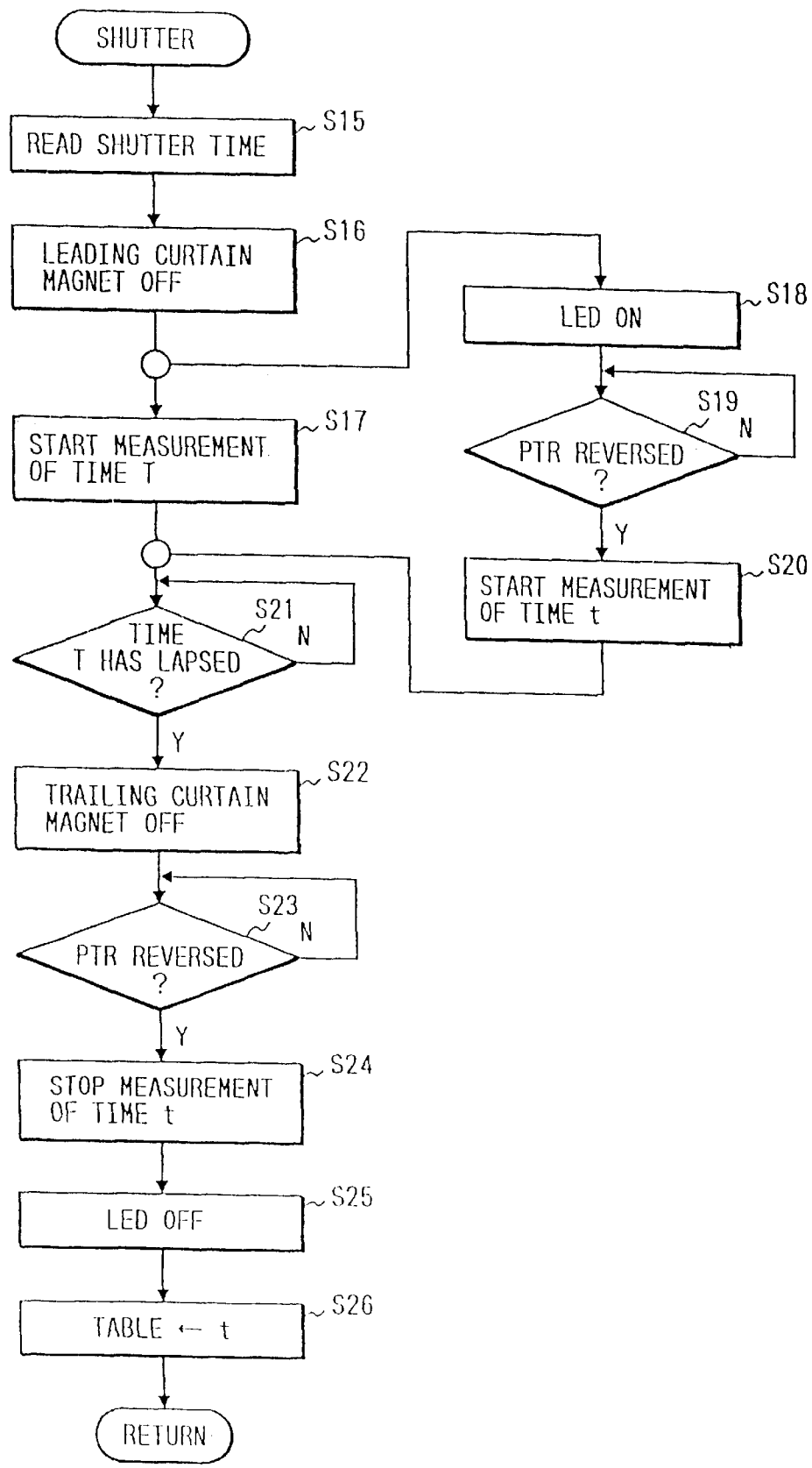
FIG. 6 is a flow chart showing the operation of the camera according to the first embodiment.

FIG. 6 is a flow chart showing the shutter curtain moving state detection routine in step S8.

In step S15, a shutter time T to be controlled, which is obtained in step S2, is read out. In step S16, energization to the leading curtain magnet is stopped to start moving of the leading curtain 15. Thereafter, processing operations respectively started from steps S17 and S18 are simultaneously executed. For the sake of simplicity, a case will be exemplified below wherein the control time T in this embodiment is sufficiently longer than each curtain moving time. When the control time T is extremely short, time measurement and management of the measurement must be performed by a known method such as interrupt processing.

In step S17, measurement of the control time T is started. In step S18, the LED 18 begins to be turned on simultaneously with step S17. In step S19, the control waits until the output from the PTR 19 is inverted in response to the beginning of passage of the leading curtain 15. This corresponds to the timing 22 in FIG. 3D. In step S20, measurement of a measurement time t is started.

In step S21, the control waits for the completion of measurement of the control time T. In step S22, since the control time T has lapsed, energization to the trailing curtain magnet is stopped to start moving of the trailing curtain 16. In step S23, the control waits until the output from the PTR 19 is inverted in response to the beginning of passage of the trailing curtain 16. This corresponds to the timing 23 in FIG. 3D. In step S24, time measurement is stopped to obtain the time t. In step S25, since the measurement has been finished, the LED 18 is turned off. In step S26, the measured time t is stored in a table representing the correspondence between nominal values and control times (to be described later).

Table 1 below is an example of a table which is stored in an internal memory of the CPU 32, and summarizes the relationship between nominal values of shutter times and control values.

TABLE 1

| Nominal Value (T) | Control Value (t) |
|---|---|
| 1/2000 | 1/2200 |
| 1/1000 | 1/1090 |
| 1/500 | 1/500 |
| : | : |
| 1/2 | 1/2 |
| 1/1 | 1/1 |

Table 1 shows values at unit-step intervals for the sake of simplicity, but in practice, tables are prepared for a fraction of unit step. Note that the nominal value is a shutter time value which is arbitrarily selected upon operation of the setting buttons 11 when, e.g., a manual mode is set. The control value is a value of the actually measured time t when control is made using the nominal value itself as the control time T in FIG. 6. Therefore, the nominal value is often different from the control value although the difference is a very small value.

In the example shown in Table 1, the measurement result of the detection means 37 in the previous exposure operation is reflected, and recordings indicate that control values are slightly shorter than the nominal values 1/2000 and 1/1000. As for other shutter times, the initial nominal values are recorded since they are not selected in the exposure operation, or the nominal values are left unchanged since the results of the detection means 37 happen to coincide with the nominal values if they are selected.

Figure 7:
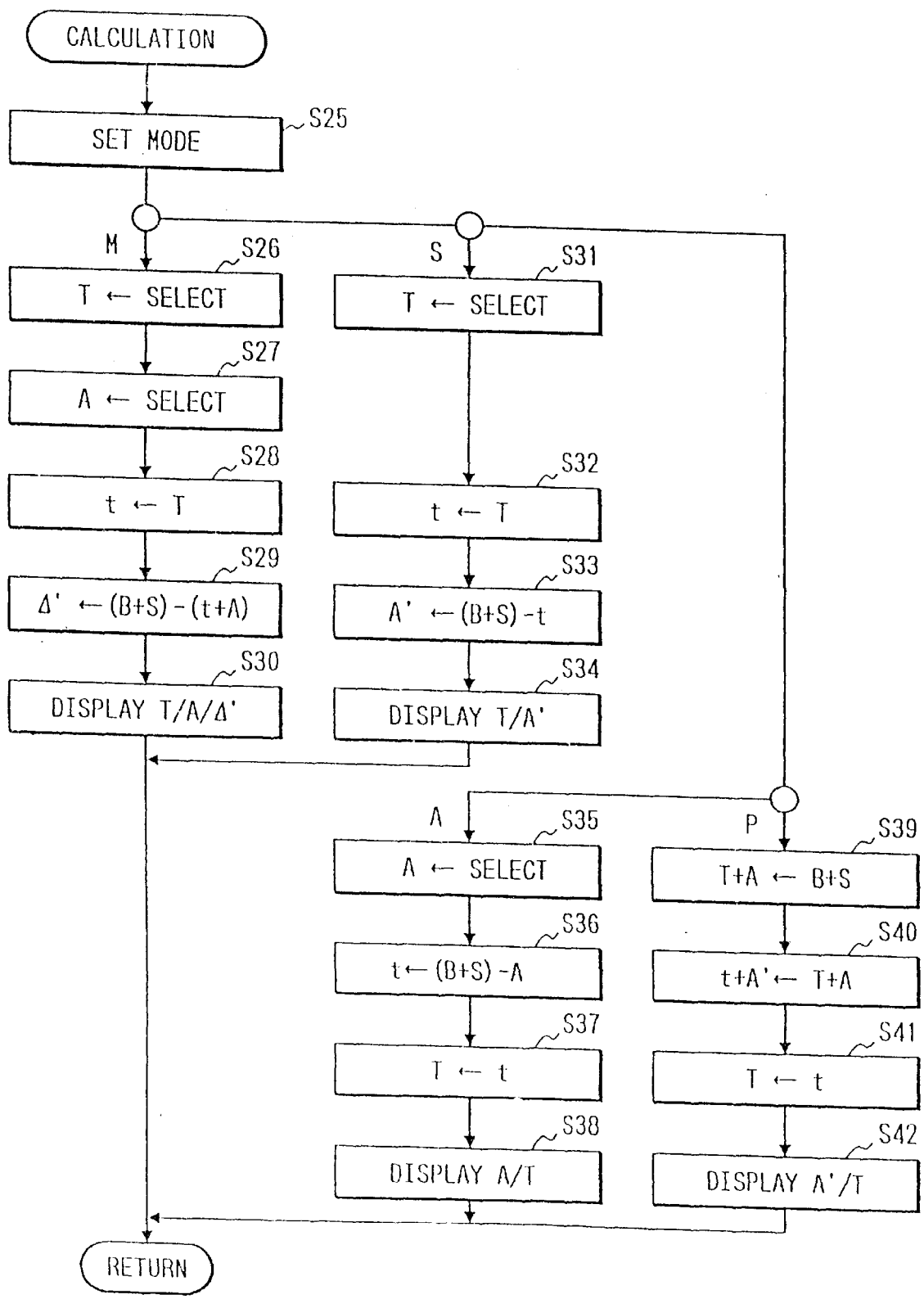
FIG. 7 is a flow chart showing the operation of the camera according to the first embodiment.

FIG. 7 is a flow chart showing the calculation processing routine in step S2 (FIG. 5). Basic formulas in exposure control of the camera will be explained below.

If the object luminance is represented by BV, the film sensitivity is represented by SV, the shutter time is represented by TV, and the aperture value is represented by AV, a proper exposure condition must satisfy the following formula:

$$BV+SV=TV+AV \quad (1)$$

Note that "V" s in formula (1) are omitted for the sake of simplicity in FIG. 7.

In step S25, an exposure mode selected using the setting buttons 11 is discriminated. The exposure mode includes four modes, i.e., a manual (M) mode, a shutter time priority (S) mode, an aperture priority (A) mode, and a program (P) mode. As will be described later, processing starting from step S26 is executed if the manual (M) mode is selected; step S31 if the shutter time priority (S) mode is selected; step S35 if the aperture priority (A) mode is selected; and step S39 if the program (P) mode is selected.

In the case of the manual (M) mode, the nominal value of the shutter time selected using the setting buttons 11 is read in step S26. In step S27, the aperture value selected using the setting buttons 11 is similarly read. In step S28, the control value is calculated from the nominal value of the shutter time on the basis of Table 1. In step S29, a deviation amount Δ between the control and the nominal values is calculated from the difference between the proper exposure condition given by BV+SV in formula (1), and a sum (tV+AV) of the selected control value tV and the selected AV value. If the control and the nominal values of the shutter time have no difference therebetween, we have:

$$\Delta=(BV+SV)-(TV+AV)$$

However, Δ is calculated from an actual operation condition.

In step S30, TV, AV, and Δ described above are displayed on the LCD 12. Since the shutter time selected by a photographer is TV as the nominal value, TV is displayed in place of the control value tV. However, an actual exposure deviation amount Δ is required to faithfully reflect the intention of photographing.

In the case of the shutter time priority (S) mode, in step S31, the nominal value of the shutter time selected using the setting buttons 11 is read. In step S32, the control value t is calculated from the nominal value T of the shutter time on the basis of Table 1. In step S33, a proper aperture value AV' is calculated using the following formula obtained by modifying formula (1):

$$AV'=(BV+SV)-AV$$

In step S34, TV and AV' described above are displayed on the LCD 12. Since the shutter time selected by a photographer is TV as the nominal value, TV is displayed in place of tV. However, as for the aperture value, it is convenient for the photographer to display a value AV' to be actually controlled.

In the case of the aperture priority (A) mode, in step S35, the aperture value selected using the setting buttons 11 is read. In step S36, a proper shutter time tV is calculated using the following formula obtained by modifying formula (1):

$$tV=(BV+SV)-AV$$

In step S37, a nominal value TV' closest to the calculated control value tV of the shutter time is obtained on the basis of Table 1. In step S38, TV' and AV are displayed on the LCD 12. As for the shutter time, it is convenient for the photographer if the value TV' to be actually controlled is displayed.

In the case of the program (P) mode, TV and AV as nominal values are calculated using formula (1) in step S39. In step S40, the control value tV is calculated from the nominal value TV of the shutter time on the basis of Table 1, and an aperture value AV' which can provide an exposure amount equivalent to TV+AV is calculated. In step S41, a nominal value TV' closest to the calculated control value tV of the shutter time is obtained based on Table 1. In step S42, TV' and AV' described above are displayed on the LCD 12.

Figure 8:
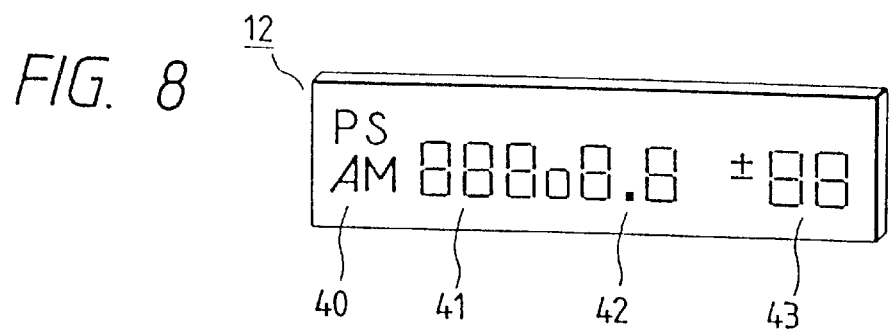
FIG. 8 is a view showing a display of the camera according to the first embodiment.

FIG. 8 is a front view showing an example wherein all the segments prepared on the LCD 12 are turned on. A segment 40 displays the exposure mode selected using the setting buttons 11, i.e., one of the manual mode (M), the shutter time priority mode (S), the aperture priority mode (A), and the program mode (P). A segment 41 displays the shutter time TV or TV' which is manually or automatically set. A segment 42 displays the aperture value AV or AV' which is manually or automatically set. A segment 43 displays the deviation amount Δ in the manual mode.

As described above, in the manual mode, an exposure deviation amount to be displayed is corrected based on a real shutter time. In the shutter time priority mode, an aperture value to be controlled is corrected based on the real shutter time. In the aperture priority mode, a shutter time to be controlled is corrected based on the real shutter time. In the program mode, both the shutter time and aperture value to be controlled are corrected based on the real shutter time. Furthermore, the control means displays numerical values based on the real shutter time.

Therefore, since the exposure deviation amount to be displayed is corrected based on the real shutter time in the manual mode, the aperture value to be controlled is corrected based on the real shutter time in the shutter time priority mode, the shutter time to be controlled is corrected based on the real shutter time in the aperture priority mode, and both the shutter time and aperture value to be controlled are corrected based on the real shutter time in the program mode, a proper exposure amount can always be obtained. Furthermore, since the control means displays an exposure condition using numerical values based on the real shutter time, a photographer can recognize the real operation condition.

In this embodiment, an exposure condition is displayed on the LCD of the camera main body. Alternatively, by adding a known data output function, the same function may be easily achieved by an LCD provided to an accessary such as a data back attached to the camera. In particular, in the case of the data back, not only a display but also imprint recording of a real shutter time can be simultaneously attained.

In this embodiment, correction is executed after a single measurement. However, correction may be made on the basis of a plurality of operation results.

Furthermore, since the detection means comprises an optical detection means consisting of a light-emitting means and a light-receiving means, detection is facilitated by electrical control. However, other detection methods such as magnetic detection means, detection means based on a capacitive change, and the like may be adopted.

As described above, according to this embodiment, the control means is arranged to control the calculation means to perform an exposure calculation on the basis of a real shutter time obtained by the measurement means. Therefore, control or display associated with a shutter time can be executed based on the real shutter time measured by the measurement means, and an exposure amount can be accurately calculated or displayed.

The second embodiment of the present invention will be described below with reference to FIGS. 9 to 20.

Figure 9:
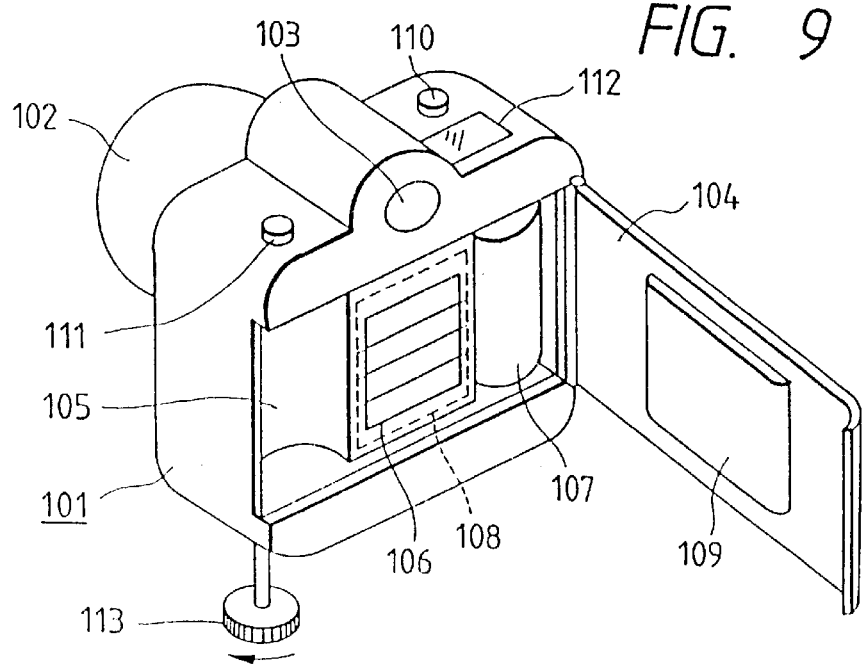
FIG. 9 is a perspective view of a camera with a recording medium forwarding device according to the second embodiment of the present invention.

FIG. 9 is a perspective view showing a camera with a recording medium forwarding device according to the present invention.

Referring to FIG. 9, a rear cover 104 is open. A film patrone (not shown) is loaded on a patrone chamber 105, and a film pulled out from the patrone is wound around a spool 107 via a portion in front of an aperture 106. A pressure plate 109 arranged on the inner surface of the rear cover 104 presses a film (not shown) against the aperture 106 to keep it flat. A shutter 108 (indicated by a broken line in FIG. 9), which is arranged inside the aperture 106, covers a range slightly wider than the aperture 106, and guides object light via a lens 102 onto a film frame for a predetermined period of time.

A photographer visually confirms, from a finder 103, the state of an object via the lens 102, and instructs to start an exposure by depressing a release button 110. Exposure modes and various conditions can be confirmed on an LCD (liquid crystal display) 112. A plurality of setting buttons 111 are operation buttons for arbitrarily setting the exposure modes and various conditions, instructing the start of a rewind operation, and the like. A photographer operates these buttons while confirming characters and the like on the LCD 112.

A film rewind operation of a camera 101 is normally motor-driven using an internal motor. However, the camera 101 of this embodiment has a manual rewind knob 113. When a shutter blade breaks as in a problem with the conventional camera, high-speed movement of a film by the motor rewind operation using the internal motor is inhibited, and only an operation using the manual rewind knob 113 is permitted, so that the film can only be rewound at a low speed.

When a warning is generated, as will be described later, the manual rewind knob 113 is pulled down, as shown in FIG. 9, and is rotated in the direction of an arrow in FIG. 9, so that a photographed film is accommodated in a patrone again. When the rewind operation is manually performed, since the film moves at a low speed, the degree of scratches formed by a projecting blade can be minimized.

Figure 10:
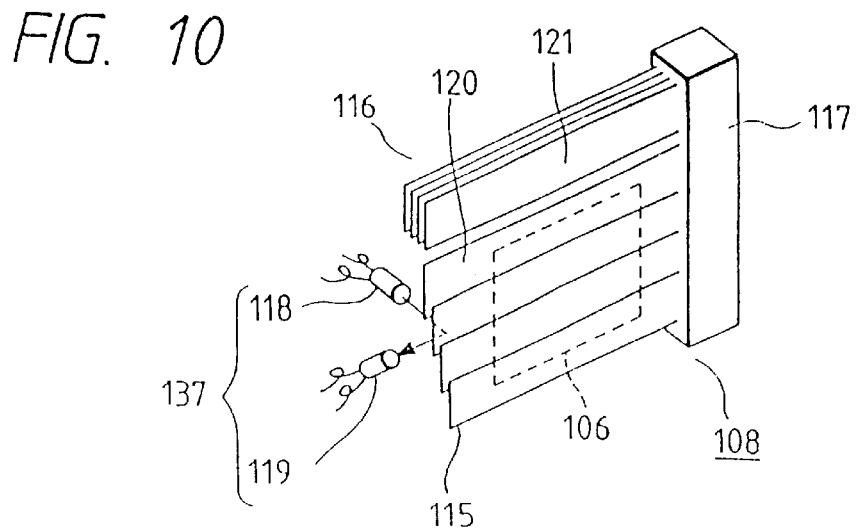
FIG. 10 is a perspective view showing shutter curtains according to the second embodiment.

FIG. 10 is a perspective view of the shutter 108 according to the present invention. Only the positional relationship between the shutter 108 and the aperture 106 in the camera 101 shown in FIG. 9 will be explained below with reference to FIG. 10.

FIG. 10 illustrates a state before the release button 110 is depressed, i.e., a state before the start of an exposure. In this state, the aperture 106 indicated by the broken line in FIG.

10 is covered by a leading curtain 115. The leading curtain 115 is normally constituted by a plurality of blades. As shown in FIG. 10, the leading curtain 115 is constituted by, e.g., four blades, and is spread with small overlapping portions when it covers the aperture 106. A slit formation blade 120 at the rearmost side (film surface side) in the leading curtain 115 is a blade for forming a slit.

Similarly, a trailing curtain 116 is constituted by a plurality of blades, and stands by in a stacked state at a position above the aperture 106 in the state shown in FIG. 10. A slit formation blade 121 at the frontmost side (object side) in the trailing curtain 116 is a blade for forming the slit, and forms the slit together with the above-mentioned slit formation blade 120.

A block 117 is a portion which accommodates leading and trailing curtain magnets described above with reference to FIG. 10, moving springs, and the like, and basically accommodates the above-mentioned two electromagnets for independently locking the curtains, two spring systems for respectively moving the curtains, a link mechanism for vertically translating the blades, and the like.

An exposure operation from the state shown in FIG. 10 is performed as follows.

First, the leading curtain magnet releases the leading curtain 115. Then, the leading curtain 115 is folded and retracted to a position below the aperture 106. Thus, a member for shielding object light is removed from the aperture 106 portion, and an exposure onto the film is started. After an elapse of a predetermined period of time, the trailing curtain magnet releases the trailing curtain 116. Then, the trailing curtain 116 moves downward from the illustrated position in FIG. 10 to spread over the aperture 106. With this operation, the aperture 106 is covered by the trailing curtain 116 in turn, and the exposure for the predetermined time is completed.

After the above-mentioned exposure operation, the film is fed by one frame by a wind-up mechanism (not shown), a new, non-exposed portion of the film faces the aperture 106, and the curtains 115 and 116 move upward to be restored to a state before the exposure. On the other hand, in the shutter 108, a detection means 137 constituted by an LED (light-emitting diode) 118 and a PTR (phototransistor) 119 is arranged at the position shown in FIG. 10. When the leading or trailing curtain 115 or 116 is present at that position, light emitted from the LED 118 is reflected by the slit formation blade 120 or 121 of the curtain, and is incident on the PTR 119. On the other hand, when no curtains are present, no light is incident on the PTR 119. With the above-mentioned operation, the dynamic timing relationship of the curtains can be detected. More specifically, when the leading or trailing curtain 115 or 116 moves and shields a light beam between the LED 118 and the PTR 119, the output from the PTR 119 is inverted. Therefore, when the interval between the inversion timings is measured, a dynamic condition can be analyzed.

FIGS. 11A to 11H are timing charts showing the operations of the shutter 108 and the detection means 137. That is, FIGS. 11A to 11H show the moving states of the curtains, which change depending on the ON/OFF timings of the magnets (MGs) for controlling the curtains, and a change in detection signal from the PTR 119. When the release button 110 is depressed, the leading and trailing curtain magnets are energized and turned on to start to electrically lock the corresponding curtains. That is, the mechanical locking operation executed before depression of the release button 110 is switched to electrical control at that timing.

Thereafter, stop control of the lens 102 is executed by a mechanism operation (not shown), and a reflection mirror in the photographing optical path is moved upward. Then, the leading curtain magnet is turned off. With this operation, the leading curtain 115 is moved, as indicated by a moving curve 140. A range F indicated by broken lines represents the vertical range of the aperture 106, and the curtains are moved in the opening F along paths indicated by the moving curves 140 and 141.

At this time, since the slit formation blade 120 of the leading curtain 115 passes the position in front of the detection means 137 during its movement, the output from the PTR 119 is inverted, as indicated by a timing 142. Thereafter, the trailing curtain magnet is turned off after an elapse of a time T as a predetermined exposure time. Thus, the trailing curtain 116 is moved across the opening F, as indicated by the moving curve 141. At this time as well, the trailing curtain 116 passes the position in front of the detection means 137, and inverts the output from the PTR 119 at a timing 143.

When the time interval between the inversion timings 142 and 143 of the PTR 119 obtained, as described above, is measured, it can be detected that a true exposure time is t. For example, even when an exposure control circuit accurately measures a prospective time T and drives the magnets at accurate timings, if the control time t obtained from the PTR 119 is different from the prospective time T, it can be determined that a mechanical system suffers an operation error.

Figs. 11E and 11F show examples of the output from the PTR 119 when a blade is broken.

Fig. 11E shows an output obtained when the slit formation blade 120 of the leading curtain 115 is broken. In this case, the output from the PTR 119 rises at a timing 144 earlier than the timing 142. FIG. 11F shows an output obtained when the slit formation blade 121 of the trailing curtain 116 is broken. In this case, the output from the PTR 119 falls at a timing 145 later than the timing 143. FIG. 11G shows an output obtained when a blade other than the slit formation blade 120 in the leading curtain 115 is broken. In this case, a pulse 146 due to the broken blade is observed immediately after the timing 142. FIG. 11H shows an output obtained when a blade other than the slit formation blade 121 of the trailing curtain 116 is broken. In this case, an extra pulse 147 is observed immediately before the timing 142.

When a blade is broken, as described above, the breakage can be discriminated by only the magnitude of the measurement result t. This discrimination will be described in detail later.

As a discrimination method other than the method of obtaining the time t, the presence/absence of a broken blade can be discriminated by measuring the intervals between the OFF timings of the leading and trailing curtain magnets and the above-mentioned timing 142 or 143, or observing a waveform immediately after the timing 142 or immediately before the timing 143.

Figure 12:
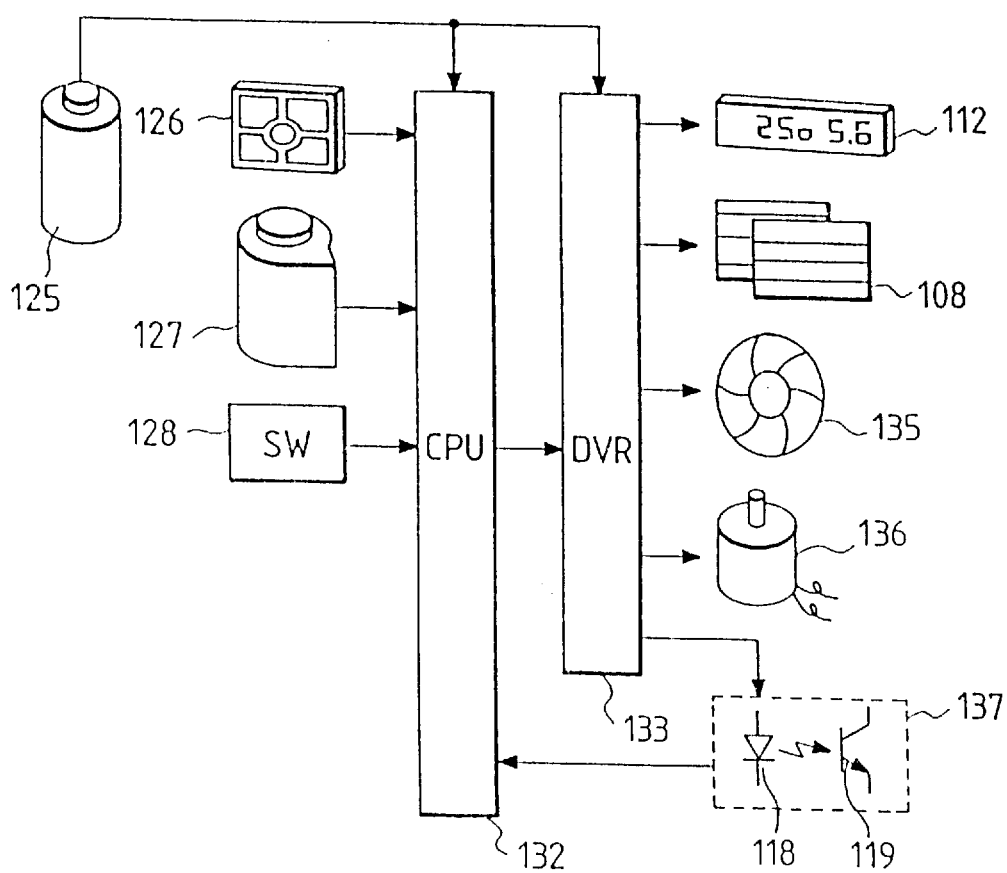
FIG. 12 is a block diagram of the camera according to the second embodiment.

FIG. 12 is a block diagram showing the electrical circuit of the camera 101 which controls the above-mentioned operations. This circuit uses a battery 125 as a power supply, and central control is executed by a CPU 132. Input signals to the CPU 132 are as follows.

A photometry means 126 is a sensor means comprising a photodiode for measuring brightness values on a plurality of split portions of an object, and a plurality of photometry values are input from the photometry means 126 to the CPU 132. A film sensitivity detection means 127 reads a code signal printed on, e.g., the side surface of a loaded film patrone, and film sensitivity information is input from the film sensitivity detection means 127 to the CPU 132. A switch detection means 128 includes timing switches for detecting the sequence states of the camera 101 in addition to manual operation switches such as switches interlocked with the above-mentioned release button 110 and the setting buttons 111, and various kinds of status information of the camera are input from the switch detection means 128 to the CPU 132.

The output from the CPU 132 executes the following driving operations via a driver means 133.

The output from the CPU 132 drives the LCD 112 to display information associated with the selected exposure and operation modes, warning information, and the like. The output from the CPU 132 controls the shutter 108, more specifically, the interval between the operation timings of the leading and trailing curtain magnets, i.e., the exposure time. The output from the CPU 132 drives a stop 135 in the lens 102 to control the passing light amount. The output from the CPU 132 drives a motor 136 to control the wind-up and rewind feed operations of the film, the biasing operation of the above-mentioned shutter driving springs, and the like. The output from the CPU 132 controls the detection means 137. More specifically, the output from the CPU 132 turns on the LED 118 for a required period of time, and the CPU 132 receives a signal generated by the PTR 119.

Figure 13:
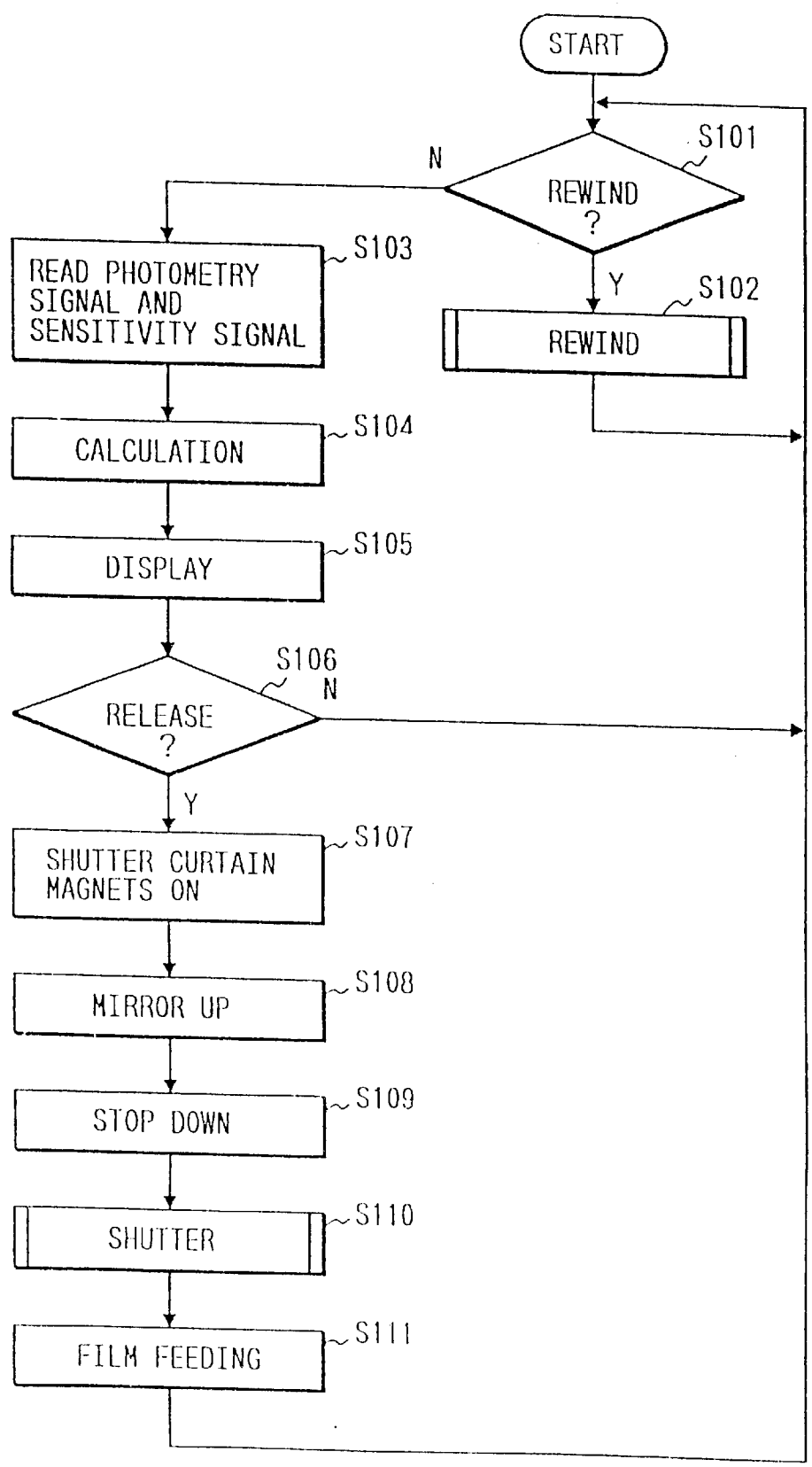
FIG. 13 is a flow chart showing the operation of the camera according to the second embodiment.

FIG. 13 is a flow chart showing the processing routine by the CPU 132 in FIG. 12. This routine is repetitively executed while the power supply is ON.

In step S101, it is checked via the switch detection means 128 if one of the operation buttons 11 is depressed to select a rewind mode. If N (NO) in step S101, the flow jumps to step S103.

Figure 16:
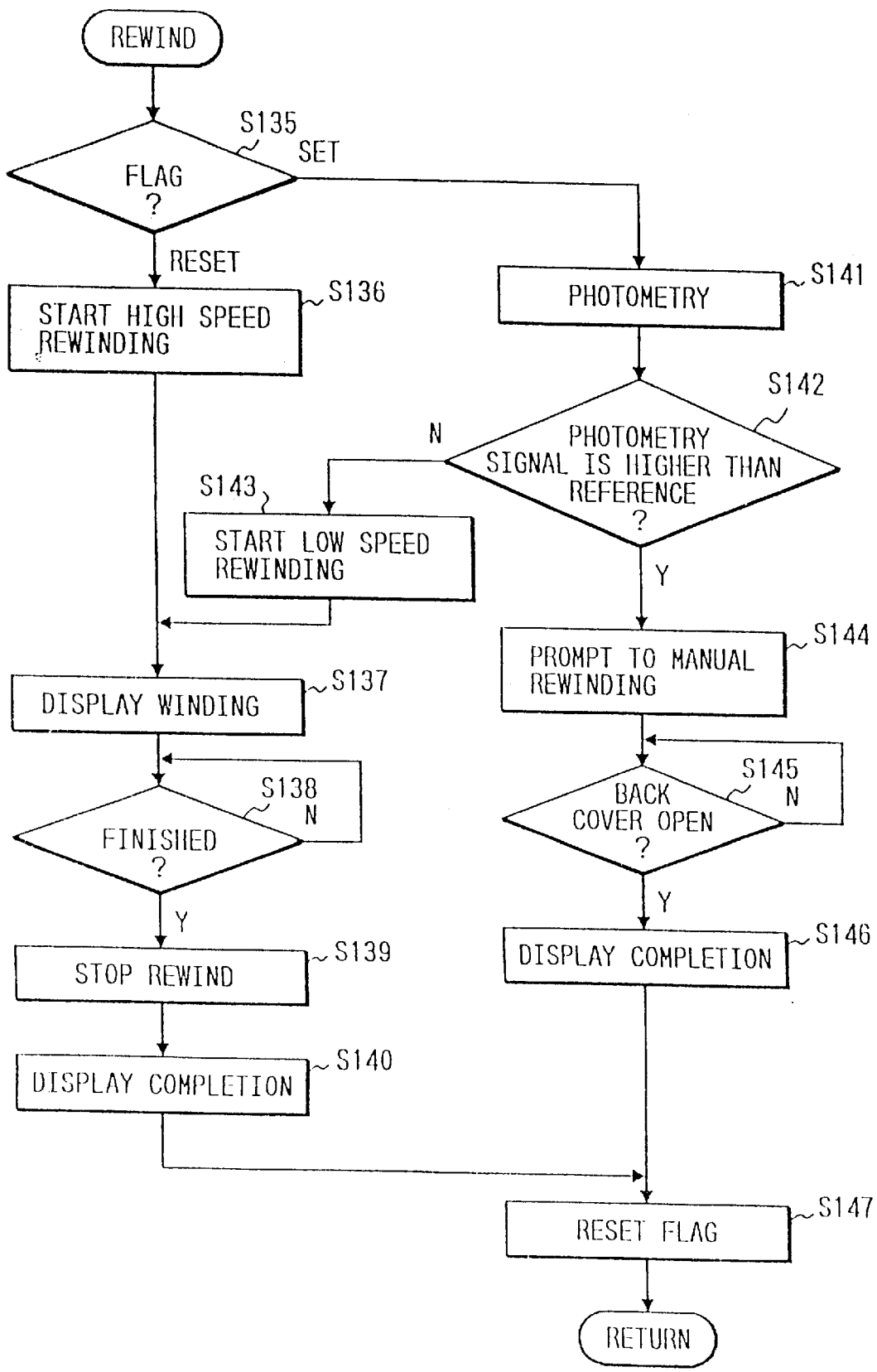
FIG. 16 is a flow chart showing the operation of the camera according to the second embodiment.

In step S102, a rewind routine shown in FIG. 16 is executed. After execution of the rewind routine, the flow returns to step 103.

In step S103, a photometry signal and a sensitivity signal are respectively read from the photometry means 126 and the sensitivity detection means 127. In step S104, the read signals are calculated to obtain a shutter time and an aperture value as a proper exposure condition. In step S105, the exposure condition calculated in the above step is displayed on the LCD 112.

In step S106, it is checked via the switch detection means 128 if the release button 110 is depressed. If N in step S106, the flow returns to step S101 to repeat the above-mentioned processing. However, if Y in step S106, the leading and trailing curtain magnets are turned on in step S107, as has been described above with reference to FIGS. 11A and 11B. In step S108, a reflection mirror (not shown) is moved upward and retracted from the photographing optical path. In step S109, the stop 135 is controlled to have a predetermined stop aperture. In step S110, a shutter routine for controlling the exposure amount onto the film by opening/closing the shutter 108, and a shutter curtain moving state detection routine using the detection means 137 are executed. The detection routine will be described in detail later with reference to FIGS. 14 and 15. In step S111, since the exposure operation has been finished, the motor 136 is rotated in the forward direction to feed the film and to perform the biasing operation of the mechanism. In this manner, since a series of exposure operations are completed, the flow returns to step S101, and the above-mentioned processing is repeated.

Figure 14:
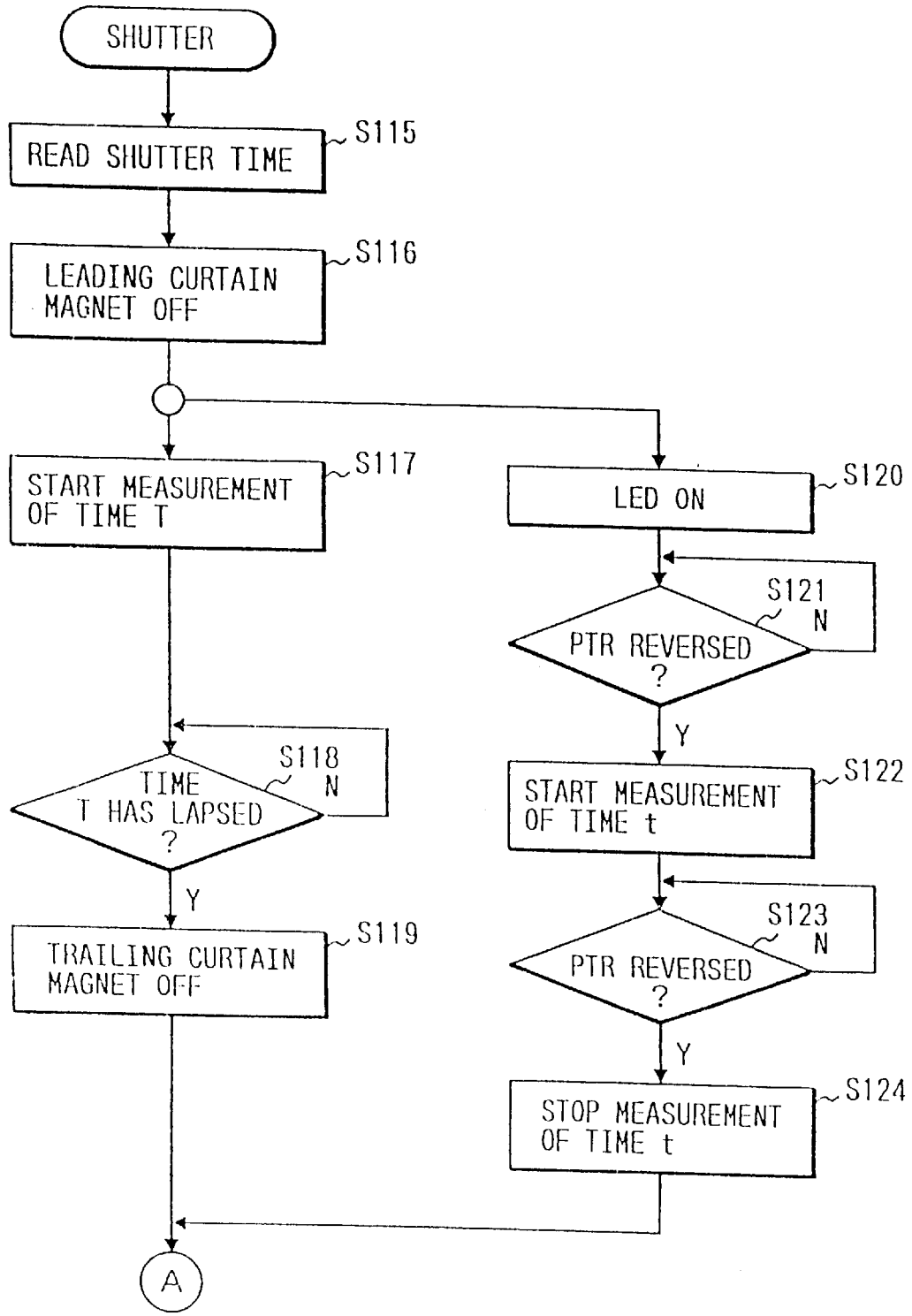
FIG. 14 is a flow chart showing the operation of the camera according to the second embodiment.
Figure 15:
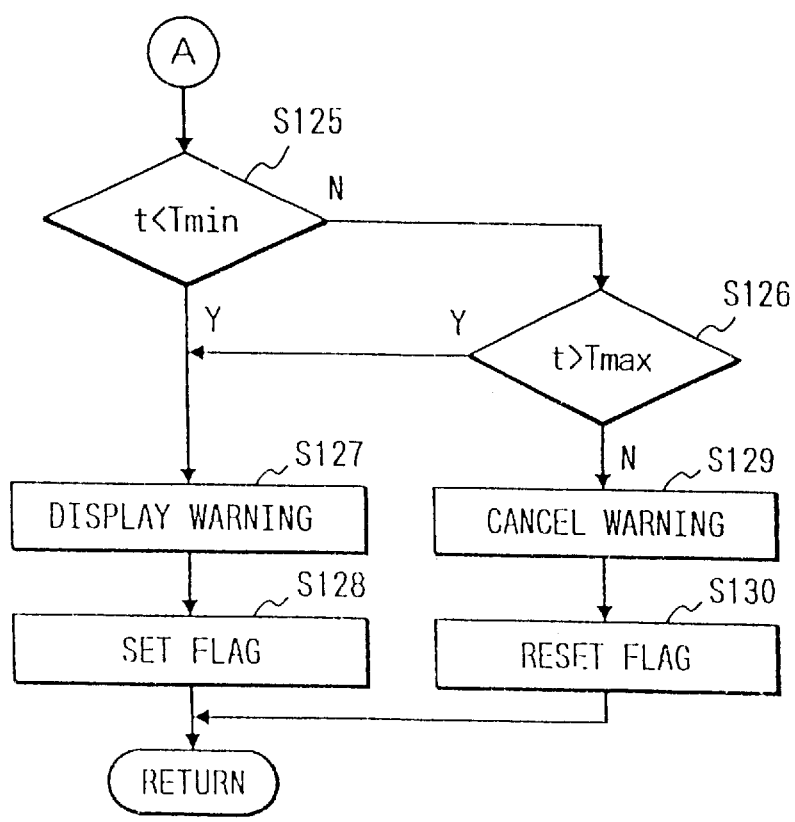
FIG. 15 is a flow chart showing the operation of the camera according to the second embodiment.

FIGS. 14 and 15 are flow charts showing in detail the shutter routine (step S110).

In step S115, a shutter time T to be controlled, which is obtained in step S104, is read out. In step S116, energization to the leading curtain magnet is stopped to start movement of the leading curtain 115. Thereafter, processing operations respectively starting from steps S117 and S120 are simultaneously executed.

In step S117, measurement of the control time T is started. In step S118, the control waits for the completion of measurement of the control time T. In step S119, since the control time T has lapsed, energization to the trailing curtain magnet is stopped to start movement of the trailing curtain 116.

In step S120, the LED 118 begins to be turned on simultaneously with step S117. In step S121, the control waits for inversion of the output from the PTR 119 in response to the beginning of passage of the slit formation blade 120 in the leading curtain 115. In step S122, measurement of a measurement time t is started. In step S123, the control waits for inversion of the output from the PTR 119 in response to completion of passage of the slit formation blade 121 in the trailing curtain 116. In step S124, the measurement of the measurement time t is stopped. Since the measurement has been finished, the LED 118 is turned off.

In step S125 (FIG. 15), it is checked if the measured time t is shorter than a minimum allowable time Tmin, which is predetermined for the control time T. In step S126, it is checked if the measured time t is longer than a maximum allowable time Tmax, which is predetermined for the control time T.

In step S127, a warning display is made since it is determined in step S125 or S126 that the measured time falls outside an allowable time width. This warning indicates that a broken blade as described above with reference to FIGS. 11E to 11H is found. A display example will be described later. In step S128, a flag is set since a broken blade is detected. This flag is set to use the information indicating that the shutter 108 suffers a broken blade in a rewind operation later, and is stored in, e.g., an internal RAM of the CPU 132. Since the rewind routine is not always executed immediately after the end of this routine, and the battery 125 may be exchanged during this interval, a backup battery (not shown) is required for holding data in the CPU 132. As another method, this flag may be stored in a nonvolatile memory directly connected to the CPU 132.

In step S129, a warning display is canceled since it is determined in step S125 or S126 that the measured time t falls within the allowable time width. In step S130, the flag is reset. The warning cancel operation in step S129 and the flag reset operation in step S130 are performed when the camera was repaired as a result of the previous warning display, and no problem was found in a later operation, or when a warning display has never been performed.

FIG. 16 is a flow chart for explaining the details of the rewind routine (step S102) in FIG. 13.

Figure 18:
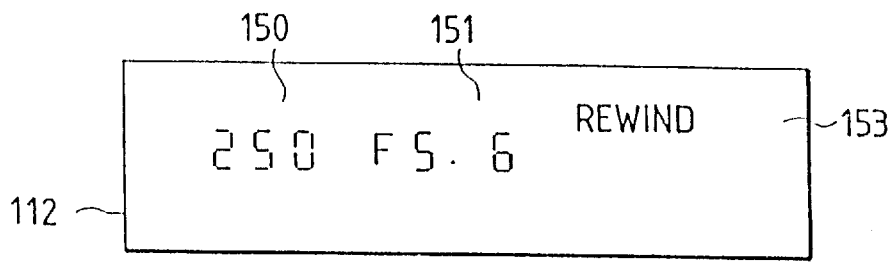
FIG. 18 is a front view showing a display example in the camera according to the present invention.

In step S135, it is checked if the flag is set. In step S136, a normal film rewind operation is executed since it is determined in step S135 that the flag is reset, i.e., no abnormality of the shutter 108 was detected in the previous operation. Note that the normal film rewind operation corresponds to a high-speed mode for rotating the motor 136 at a high speed. In step S137, a message indicating that the high-speed rewind mode is being executed is displayed. FIG. 18 shows a display example on the LCD 112.

In step S138, the control waits for completion of the rewind operation. In step S139, the motor 136 is stopped since the rewind operation has been finished. In step S140, a message indicating the end of the rewind operation is displayed. Since such a message is known to those who are skilled in the art, a display example on the LCD 112 is not shown.

Figure 19:
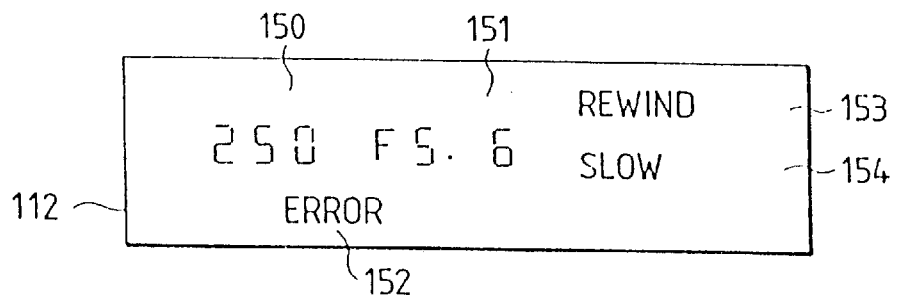
FIG. 19 is a front view showing a display example in the camera according to the present invention.

In step S141, a photometry signal from the photometry means 126 is read. In step S142, the read photometry signal is compared with a reference level. In step S143, a film rewind operation is performed in a low-speed mode by rotating the motor 136 at a low speed since it is determined in step S142 that the photometry signal is lower than the reference level, i.e., the amount of incident light from the lens 102 is small. This low-speed rewind operation is performed since it is determined that no problem is posed when the rewind operation is performed currently since the ambient luminance is low although the light-shielding performance of the shutter 108 is impaired, and a problem of scratches formed by a projecting blade can be minimized if the low-speed rewind operation is performed. FIG. 19 shows a display example on the LCD 112 in step S137 after this step.

In step S144, a film rewind operation using the motor 136 is inhibited, and a manual rewind operation is prompted since it is determined in step S142 that the photometry signal is higher than the reference level, i.e., and the amount of incident light from the lens 102 is large. In this case, a photographer can rewind the film by turning the rewind knob 113. This means that a rewind operation must not be performed currently when the light-shielding performance of the shutter 108 is impaired and the ambient luminance is high, although no problem is posed in association with scratches formed on the film by a broken blade and the low-speed rewind mode. Therefore, in a display example on the LCD 112 shown in FIG. 20, it is prompted that the manual rewind operation should be performed in a darker place.

In step S145, it is checked if the rear cover 4 is open. In step S146, a message indicating the end of the rewind operation is displayed since opening of the rear cover 4 means the end of the rewind operation of the film. Since such an end message is known to those who are skilled in the art, a display example on the LCD 112 is not shown. In step S147, the flag is reset since a series of rewind operations have been finished independently of processing executed based on the determination result in step S135. Normally, when a warning is generated in step S143 or S144, the following photographing operation is interrupted, and the camera is repaired. Therefore, the flag is preferably reset. On the contrary, when another film is loaded in this state, and the photographing operation is executed, the broken blade is detected again.

FIGS. 17 to 20 show the display examples on the LCD 112.

Figure 17:
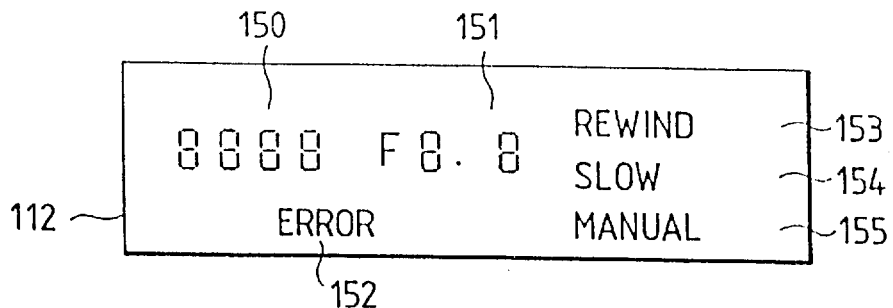
FIG. 17 is a front view showing a display example in the camera according to the present invention.

FIG. 17 shows an example wherein all the segments on the LCD 112 are turned on. A segment 150 displays a shutter time; a segment 151 displays an aperture value; a segment 152 displays detection of a broken blade; a segment 153 displays the normal rewind mode; a segment 154 displays the low-speed rewind mode; and a segment 155 displays and prompts the manual rewind mode. The segments 150 and 151 are turned on depending on the processing result in step S105. The segments 152, 153, 154, and 155 are turned on depending on the processing results in steps S136, S137, S143, and S144.

FIG. 18 shows a display example in a state wherein no broken blade is detected, and the normal rewind mode is selected and executed.

FIG. 19 shows a display example in a state wherein although a broken blade is detected, the low-speed rewind mode is selected and executed since the ambient luminance is low. The detection of a broken blade is displayed by the segment 152, and the low-speed rewind mode is displayed by the segment 154.

Figure 20:
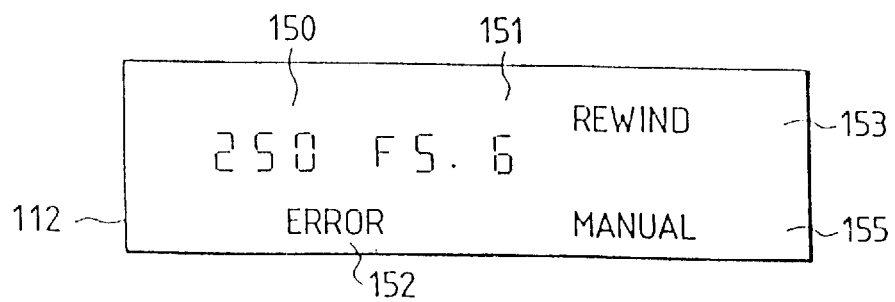
FIG. 20 is a front view showing a display example in the camera according to the present invention.

FIG. 20 shows a display example in a state wherein since a broken blade is detected, and the ambient luminance is high, the manual rewind operation in a dark place is prompted. The manual rewind mode is displayed by the segment 155.

In this embodiment, the rewind film feed operation is inhibited. However, the same effect can be expected for a wind-up operation by similar processing. In the description of this embodiment, a feed mode which can minimize scratches upon detection of a broken blade can be selected. However, the feed operation itself may be inhibited. In this case, a user can open the rear cover and can unload a film in a dark room.

In this embodiment, a set of detection means is arranged at the central portion of the aperture 106. However, a plurality of sets of detection means may be arranged to be able to detect exposure times at all positions including the exposure start or end portion. With this arrangement, the exposure times and the moving speeds of the curtains in the early, middle, and later stages of the exposure can be detected.

In this embodiment, whether or not a warning is to be generated is determined based on a single measurement result. However, it may be determined based on a plurality of operation results. Furthermore, since the detection means comprises an optical detection means consisting of a light-emitting means and a light-receiving means, detection is facilitated by electrical control. However, other detection methods such as magnetic detection means, detection means based on a capacitive change, and the like may be adopted.

As described above, according to this embodiment, a broken blade is detected, a warning message indicating this is displayed before a film is rewound, and a motor rewind operation is inhibited. For this reason, when a low-speed rewind operation is manually executed, a film free from scratches can be obtained. When the ambient luminance is low, since a low-speed motor rewind operation is executed, a film which is free from scratches and is not influenced by leaked light can be obtained.

As described above, according to this embodiment, the operating state detection means for detecting whether or not the operation of the shutter means is normal is arranged, and the forwarding mode of the recording medium is controlled in accordance with the detection output from the operating state detection means. Therefore, a trouble of the shutter can be informed during the photographing operation. Also, a film feed mode can be switched to a mode in which the film is not easily damaged, and important photographed results can be protected.

What is claimed is:

1. A device comprising:
   a measuring device;
   a blade mechanism to mechanically limit recording on a recording medium;
   a drive mechanism to drive said blade mechanism in accordance with a value of one control value selected to be set from a plurality of control values;
   a detector to detect when said blade mechanism is driven by said drive mechanism in accordance with said value, wherein an actually measured value measured by said measuring device corresponds to said value;
   a memory to store said value and said actually measured value in relation to each other;
   an extractor to extract, based on said selected value of the control value, the actually measured value corresponding to the selected value; and a controller to control an operation of the device by performing an operation based on the value extracted by said extractor.

2. A camera comprising:

a calculator to calculate a photographing condition suitable for an exposure mode selected from a plurality of exposure modes;

a drive mechanism to perform a photographing operation in accordance with a nominal value of an exposure parameter calculated by said calculator;

a measuring device to measure an actually measured value of the exposure parameter in the photographing operation;

a memory to store said nominal value and said actually measured value in relation to each other;

an extractor to extract, based on one nominal value selected from a plurality of nominal values, the actually measured value corresponding to the selected nominal value; and a controller to control said calculator such that said calculator performs an exposure calculation based on the value extracted from said extractor.

3. A camera with a shutter measuring device, comprising:

a calculator to calculate a photographing condition suitable for an exposure mode selected from a plurality of exposure modes;

a shutter drive mechanism to drive a shutter in accordance with a calculated value of shutter time calculated by said calculator;

a measuring device to measure an actually measured value of shutter time upon driving of the shutter by said shutter drive mechanism;

a memory to store said calculated value of shutter time and said actually measured value of shutter time in relation to each other;

an extractor to extract, based on one calculated value of shutter time selected from a plurality of calculated values, the actually measured value of shutter time corresponding to the selected calculated value of shutter time; and a controller to control said calculator such that the calculator performs an exposure calculation based on the actually measured value of shutter time extracted from said extractor.

4. A camera according to claim 3, wherein said calculator calculates an exposure deviation amount on the basis of the actually measured value of shutter time in a manual mode.

5. A camera according to claim 4, wherein said controller comprises a display device to perform display control, and wherein the exposure deviation amount calculated by said calculator is displayed on said display device.

6. A camera according to claim 4, wherein aid controller comprises a display device to perform display control, and the aperture value calculated by said calculator is displayed on said display device.

7. A camera according to claim 3, wherein said calculator calculates an aperture value to be controlled on the basis of the actually measured value of shutter time in a shutter time priority mode.

8. A camera according to claim 3, wherein said calculator calculates a shutter time to be controlled on the basis of the actually measured value of shutter time in a stop priority mode.

9. A camera according to claim 3, wherein said controller comprises:

a display device to perform display control;

a table to store a correspondence between the actually measured value of shutter time and a display shutter time; and a selector to select the display shutter time from said table on the basis of the actually measured value of shutter time, and the display shutter time selected by said selector is displayed on said display device.

10. A camera according to claim 3, wherein said calculator calculates both an aperture value and shutter time to be controlled on the basis of the actually measured value of shutter time in a program mode.

11. A camera according to claim 3, wherein said controller comprises:

a display device to perform display control;

a table to store a correspondence between the actually measured value of shutter time and a display shutter time; and a selector to select the display shutter time from said table on the basis of the actually measured value of shutter time, and the aperture value to be controlled, calculated by said calculator, and the display shutter time selected by said selector are displayed on said display device.

* * * * *

UNITED STATES PATENT AND TRADEMARK OFFICE
CERTIFICATE OF CORRECTION

PATENT NO. : 5,835,800
DATED : November 10, 1998
INVENTOR(S) : Tetsuro Goto, et al.

It is certified that error appears in the above-identified patent and that said Letters Patent is hereby corrected as shown below:

Title Page, [75] please ADD inventor --Masanori Hasuda, Yokohama--;
[75] please change "both" to --all--;

Column 18 line 5, (claim 6), change "aid" to --said--.

Signed and Sealed this

Twenty-first Day of September, 1999

Attest:

Q. TODD DICKINSON

*Attesting Officer*　　*Acting Commissioner of Patents and Trademarks*